United States Patent
Krishna et al.

(10) Patent No.: US 7,506,160 B2
(45) Date of Patent: Mar. 17, 2009

(54) SYSTEM AND METHOD FOR ENHANCED DATA SECURITY IN OFFICE MACHINE ENVIRONMENT

(75) Inventors: Girish R. Krishna, Torrance, CA (US); Michael Yeung, Mission Viejo, CA (US); Amir Shahindoust, Laguna Niguel, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 886 days.

(21) Appl. No.: 10/987,845

(22) Filed: Nov. 12, 2004

(65) Prior Publication Data

US 2006/0107044 A1    May 18, 2006

(51) Int. Cl.
*H04L 9/00* (2006.01)
(52) U.S. Cl. .................. 713/166; 713/191; 380/37; 380/57
(58) Field of Classification Search ............. 713/191
See application file for complete search history.

(56) References Cited

U.S. PATENT DOCUMENTS 7,296,157 B2 * 11/2007 Partelow et al. ............. 713/171
2002/0131593 A1    9/2002  Parry
2003/0041269 A1    2/2003  Kurishita et al.
2003/0044009 A1 *  3/2003  Dathathraya ............... 380/55
2003/0063749 A1 *  4/2003  Revel et al. ............... 380/270
2003/0099353 A1    5/2003  Goh et al.
2004/0008842 A1    1/2004  Partelow et al.
2004/0165723 A1    8/2004  Yoda et al.

* cited by examiner

*Primary Examiner*—Nasser G Moazzami
*Assistant Examiner*—Fikremariam Yalew
(74) *Attorney, Agent, or Firm*—Tucker Ellis & West LLP (57) ABSTRACT

The present invention is directed to a system and method for adding data encryption services to a document processing device. Encryption enablement software, which includes two alternate encryption mechanisms, is received by an associated document processing device. The device then awaits an associated user's selection of an electronic document file to be encrypted and subsequently encrypts the file using one of the available encryption mechanisms. The electronic document file is divided into blocks having a preselected length. An encryption key block containing first and second key portions, is then generated. The electronic data file is then encrypted using the first encryption key portion to form first level encryption data. The first level encryption data is then decrypted using the second encryption key portion to form second level encryption data. The second level encryption data is then encrypted using the first key portion to form a final encrypted electronic document file.

21 Claims, 4 Drawing Sheets

SYSTEM AND METHOD FOR ENHANCED DATA SECURITY IN OFFICE MACHINE ENVIRONMENT

BACKGROUND OF THE INVENTION

This invention is directed to a method and system for adding data encryption services to a document processing device. More particularly, this invention is directed to a method and system for encrypting and decrypting image data using a software development kit equipped with an encryption/decryption algorithm employable by a plurality of different document processing devices.

In a conventional office setting, document processing devices, such as printers, copiers, facsimile machines and scanning devices typically include little to no inherent data security. For example, an individual with physical access to the device will generally have little difficulty in accessing the files being printed, faxed, or stored on the document processing devices. Attempts to alleviate such problems involve limiting access to the device through the use of a login and password for authorized users. However, login and password protection protect the document from access by unauthorized personnel, but do little to protect the document from access by an employee with rights to use the document processing device, but lacking the authorization to view certain documents. For example, certain Healthcare Insurance Portability and Accountability Act (HIPAA) documents require a higher level of restricted access than other documents found in a document processing device's memory.

The subject invention overcomes the aforementioned problems and provides a method and system for encrypting and decrypting image data by a document processing device.

SUMMARY OF THE INVENTION

The present invention is directed to providing enhanced data security to a document processing device by using a method and system for encrypting and decrypting image data using encryption enablement software employable by the document processing device.

In accordance with the present invention, there is provided a method for adding data encryption services to a document processing device. Encryption enablement software is first received by an associated document processing device. The encryption enablement software includes two alternative encryption mechanisms. The document processing device then receives selection data representing the selection of one of the two alternative encryption mechanisms. The selected encryption mechanism is then activated on the document processing device and an associated user is prompted to engage the encryption mechanism. The user then instructs the document processing device to begin encrypting an associated electronic document file. The document processing device then encrypts the electronic document file using an encryption algorithm set by the encryption enablement software.

In a preferred embodiment, the encryption algorithm of the method for adding data encryption services to a document processing device further includes the steps of dividing the electronic document file into blocks. An encryption key block containing first and second key portions, is then generated. The electronic data file is then encrypted using the first encryption key portion to form first level encryption data. The first level encryption data is then decrypted using the second encryption key portion to form second level encryption data. The second level encryption data is then encrypted using the first key portion to form a final encrypted electronic document file. In a preferred embodiment, the method also includes the step of decrypting the final level encryption data. In this embodiment, the decryption of final level encryption data further includes the steps of dividing the final level encryption data into first and second blocks of data. The method then generates first and second decryption key portions. Next, the final level encryption data is decrypted using the first decryption key portion to form first level decrypted data. The first level decrypted data is then encrypted using the second decryption key portion to form second level decrypted data. The second level decrypted data is then decrypted using the first decryption key portion to form final decrypted data.

Further, in accordance with the present invention, there is provided a system for adding data encryption services to a document processing device. The document processing device includes means adapted for receiving encryption enablement software, which contains two alternative encryption mechanisms. The system further includes means adapted for receiving selection data representing the selection of one of the alternative encryption mechanisms. The system also includes means adapted for activating, on the document processing device, the selected encryption mechanism. The system includes means adapted for prompting an associated user to engage the encryption mechanism and means adapted for receiving instructions from the user to commence encryption of an electronic document file. The system further includes means adapted for encrypting the electronic document file according to an encryption algorithm determined by the encryption enablement software.

In a preferred embodiment, the encryption algorithm set by the enablement software includes means adapted for dividing the electronic document filed into blocks. The algorithm also includes means adapted for generating an encryption key block that contains a first encryption key portion and a second encryption key portion. The algorithm further includes means adapted for encrypting the electronic document file using first encryption key portion to form first level encryption data. The algorithm also comprises means adapted for decrypting the first level encryption data with the second encryption key portion to form second level encryption data, and means adapted for encrypting the second level encryption data with the first encryption key portion to form final level encryption data. In a preferred embodiment, the system also includes means adapted for decrypting the final level encryption data. The means adapted for decrypting the final level encryption data includes means adapted for dividing the final level encryption data into first and second blocks. The means adapted for decrypting the final level encryption data further includes means adapted for generating a first decryption key portion and a second decryption key portion. The system further includes means adapted for decrypting the final level encryption data using the first decryption key portion, resulting in first level decrypted data. The system also includes means adapted for encrypting the first level decrypted data using the second decryption key portion, which results in second level decrypted data. The means adapted for decrypting the final level encryption data further includes means adapted for decrypting the second level decrypted data using the first decryption key portion, resulting in a decrypted electronic document file.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE PREFERRED EMBODIMENT

This invention is directed to a system and method for encrypting and decrypting image data using encryption enablement software to provide enhanced security to a document processing device. In particular, the present invention is directed to a system and method for encrypting and decrypting electronic documents transmitted to or stored on a document processing device. In the preferred embodiment, as described herein, the document processing device is suitably an image generating device. Preferably, the image generating device is a multifunctional peripheral device, capable of providing scanning, copying, facsimile and printing functions to a user.

Figure 1:
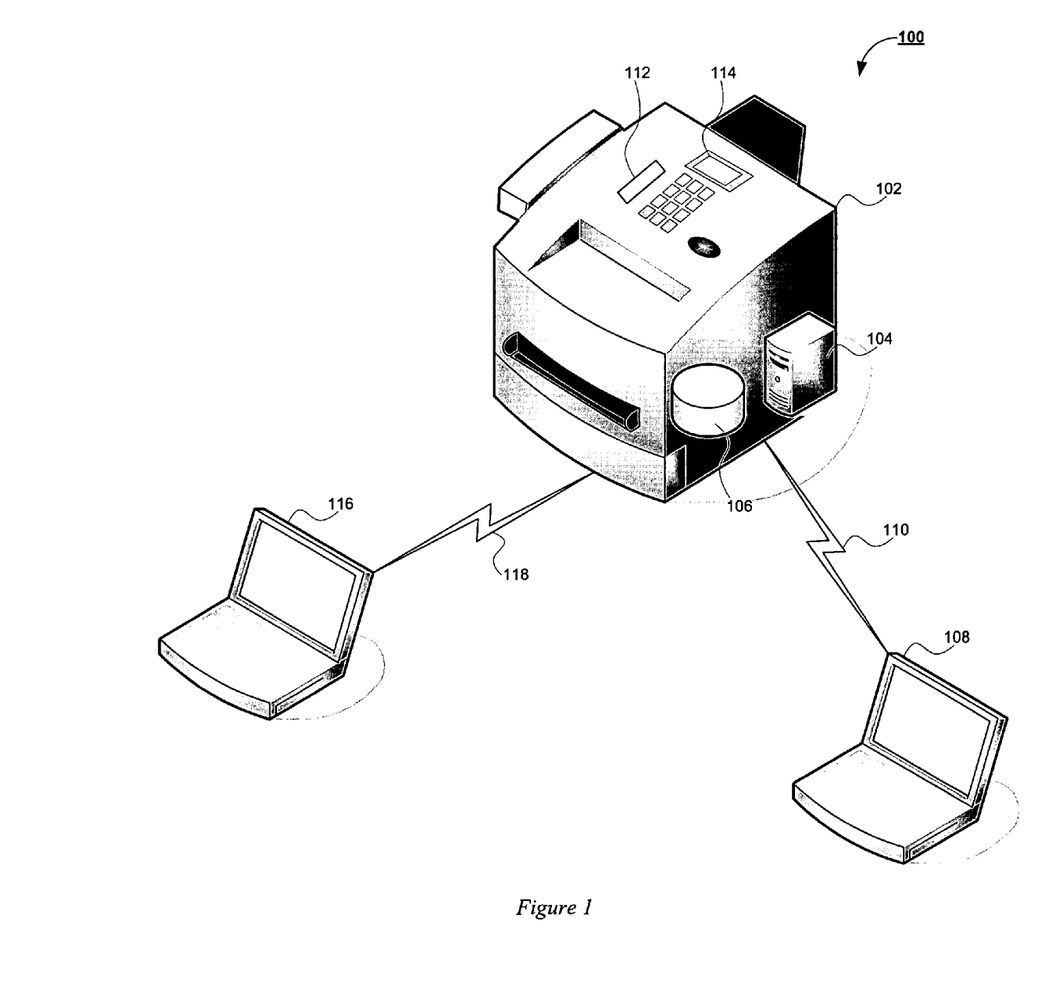
FIG. 1 is a block diagram illustrative of the system of the present invention.

Turning now to the drawings wherein the illustrations are for illustrating the preferred embodiment only, and not for delivering the same. A diagram illustrating the system 100 of the present invention is shown in FIG. 1. In the present invention, a user or system administrator is provided access a multifunctional peripheral device 102. Suitable commercially available image generating devices include, but are not limited to, the Toshiba e-Studio Series Controller. The multifunctional peripheral device 102 includes a controller 104, which controls the functions of the device 102. The controller 104 is capable of being externally or internally coupled to the multifunctional peripheral device 102. In addition to the controller 104, the multifunctional peripheral device 102 also includes a data storage device 106, a removable storage interface 112 and a user interface 114. In a preferred embodiment, the multifunctional peripheral device 102 is in data communication with an administrator computer 108 and a user computer 116.

The data storage device 106 is any mass data storage device known in the art, for example an integrated magnetic hard drive or other dynamic or static memory storage device, e.g., flash memory. Accordingly, the data storage device 106 is shown in FIG. 1 as being integrated within the multifunctional peripheral device 102. The skilled artisan will appreciate that the data storage device 106 is equally capable of being externally connected to the multifunctional peripheral device 102 without departing from the scope of the present invention. The removable storage interface 112 is any driver or interface known in the art capable of receiving and interpreting removable storage media. As is understood those skilled in the art, such removable storage interface 112 includes, but is not limited to, a USB port for a USB drive, a FireWire (IEEE1394) drive, a SecureDigital Flash Memory Card drive, a CompactFlash Memory Card drive, an optical disk drive, a magnetic disk drive, or other removable storage media drive. The user interface 114 suitably comprises a touch-screen or other input/output device capable of displaying and receiving user instructions for the operation of the multifunctional peripheral device 102.

In accordance with the present invention, an administrator at the administrator computer 108 communicates with the controller 104 of the multifunctional peripheral device 102 via a suitable communications link 110. As will be understood by those skilled in the art, the communications link 110 is any means for communication between two electronic devices, for example and without limitation, an Ethernet based network, infrared connection, Wi-Fi connection, Bluetooth connection and the like. The skilled artisan will appreciate that the communications link 110 is capable of being implemented over a computer network or by directly connecting the administrator computer 108 to the controller 104 of the multifunctional peripheral device 102. The administrator computer 108, using the communications link 110, uploads software and instructions to the data storage device 106 operatively connected to the controller 104 to effectuate control of the operations of the multifunctional peripheral device 102.

Alternatively, the administrator is capable of inserting a removable storage media, e.g., flash memory, USB memory device, optical storage medium, etc., into the removable storage media interface 112 and uploading software and instructions to the storage device 106 using the user interface 114. Either method of providing software to the multifunctional peripheral device 102 is capable of being implemented by the present invention.

The user computer 116 communicates with the multifunctional peripheral device 102 via a suitable communications link 118. As will be appreciated by those skilled in the art, the suitable communications link 118 is any means of communication between two electronic devices. For example, the communications link 118 is capable of being established over a computer network, wirelessly transmitted using Bluetooth, Wi-Fi, infrared and the like, or by directly connecting the user computer 116 to the multifunctional peripheral device 102. Over the communications link 118, the user computer 116 transmits an electronic document file to the multifunctional peripheral device 102 for processing. It will be appreciated by those skilled in the art that the subject encryption and decryption methods are capable of being implemented via hardware, e.g., an application specific integrated circuit integrated with the controller 104, or more preferably, via software uploaded to the data storage device 106 and incorporated into the general operating system of the multifunctional peripheral device 102. Once the multifunctional peripheral device 102 receives the electronic document file, it proceeds to use the encryption and decryption method described more fully below.

Figure 2:
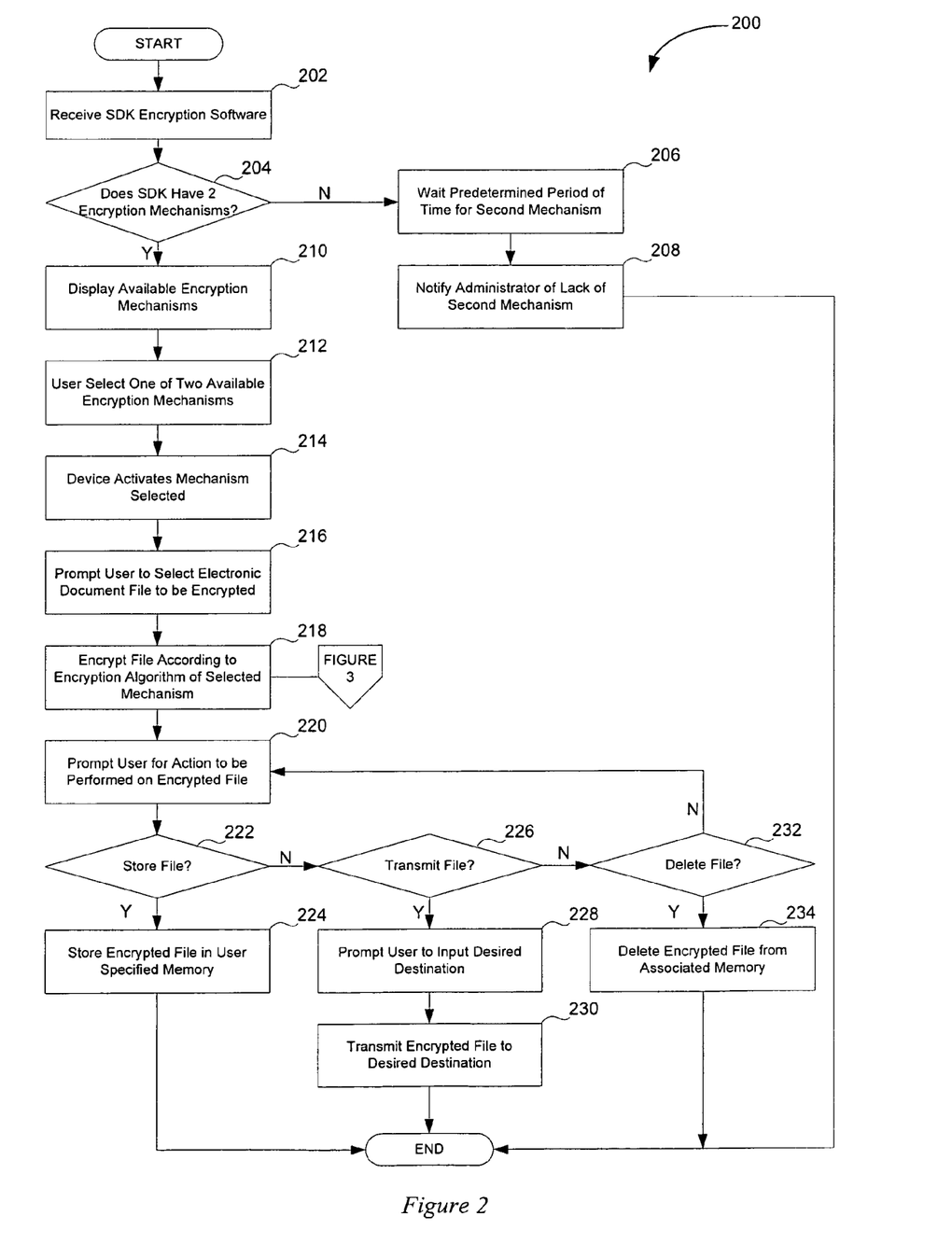
FIG. 2 is a flowchart illustrating encryption process according to the present invention.

Referring now to FIG. 2, there is shown a flowchart 200 illustrating the encryption process of the present invention. As will be understood by those skilled in the art, the preferred embodiment of the present invention is implemented using a software development kit, also known as an SDK, to incorporate the security features of the subject invention. The SDK publishes two public interfaces, including a cipher class, which enables an administrator to select one of the interfaces to provide encryption functions to encrypt any data file desired. The skilled artisan will understand that the SDK abstracts the encryption layers and does not expose the full encryption mechanism to the users. The skilled artisan will appreciate that other methods of incorporating the security enhancements of the subject invention to the multifunctional peripheral device 102 are equally capable of being implemented and the use of a software development kit in the preferred embodiment is not intended to limit the subject invention to such an implementation.

Beginning at step 202, the multifunctional peripheral device 102 receives the encryption software via any suitable means known in the art. For example, the encryption software is suitably uploaded to the multifunctional peripheral device 102 by an administrator using the user-interface 114, the removable storage medium interface 112, an associated computer 108, and the like. Thus, the administrator uses the software development kit's application programming interface to incorporate the security functions of the present invention into the general multifunctional peripheral device 102 data processing.

At step 204, it is determined whether the software received by the multifunctional peripheral device 102 contains two or more encryption mechanisms. When the multifunctional peripheral device 102 fails to receive two or more encryption mechanisms, the controller 104 will direct the device 102 to wait a predetermined period of time for a second mechanism at step 206. After the elapse of the predetermined period of time, the system administrator, or programmer, is notified at step 208 of the failure to upload the encryption software, and the attempt to upload the encryption software terminates.

When the encryption software has two encryption mechanisms, as determined in step 204, the method proceeds to display the available encryption mechanisms to an associated user at step 210. The user is then prompted to select one of the available encryption mechanisms at step 212. Once the user has selected the desired encryption mechanism, the multifunctional peripheral device 102 activates the selected mechanism at step 214. The associated user is then prompted to select the electronic document file requiring encryption at step 216. The electronic document file selected by the user is then encrypted at step 218 according to an encryption algorithm corresponding to the selected mechanism. The application of the encryption algorithms employed by the subject invention are illustrated in FIG. 3.

Figure 3:
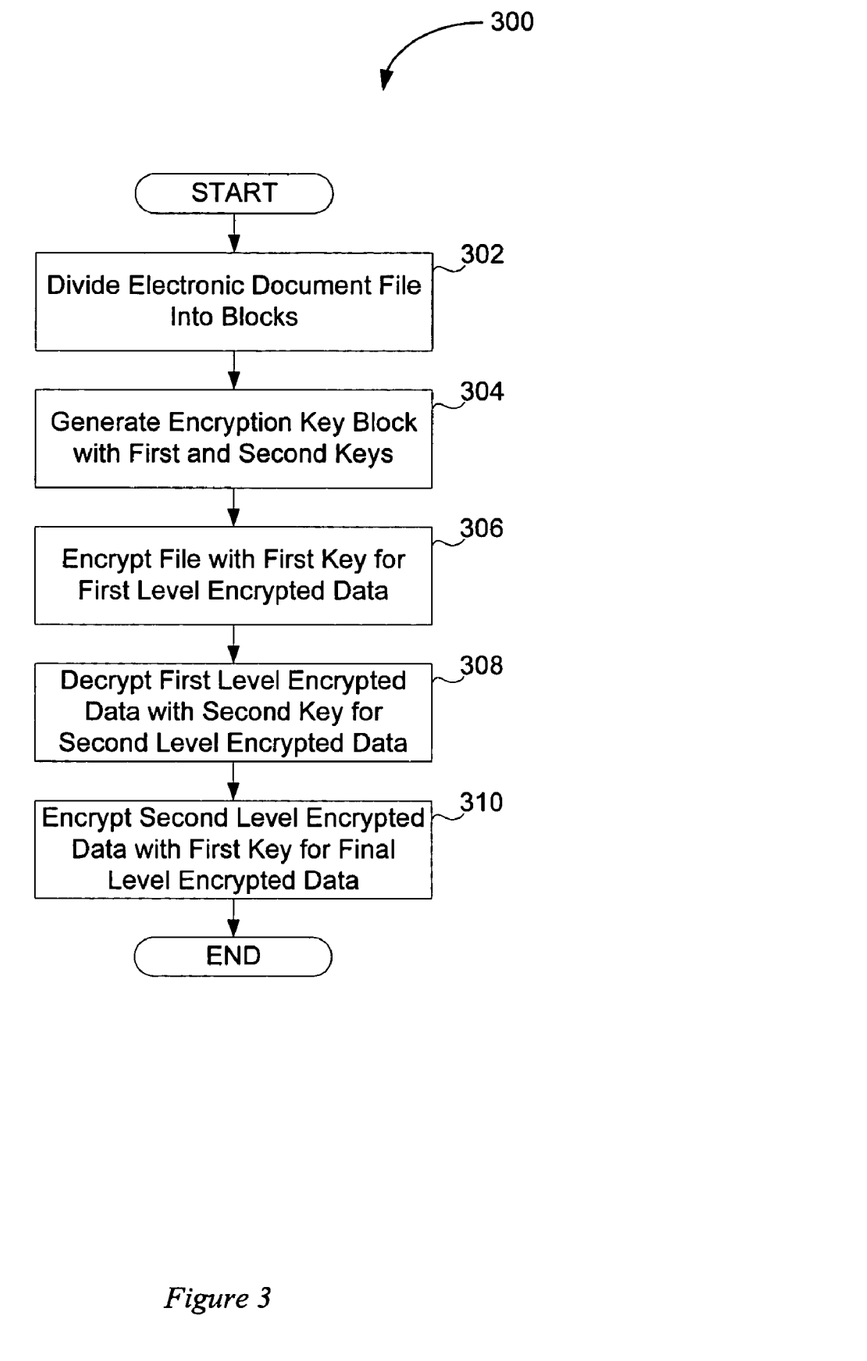
FIG. 3 is a flowchart illustrating the encryption algorithm according to the present invention.

Referring now to FIG. 3, there is shown a flowchart 300 illustrating the encryption algorithm application to the electronic data file according to the present invention. As will be appreciated by those skilled in the art, in the preferred embodiment, the present invention makes use of the Triple-Data Encryption Standard ("3DES") encryption algorithm in conjunction with MAC computations for data integrity. This governmental standard is contained in the standards document number ANSI X9.52-1998 *Public Key Cryptography For The Financial Services Industry: Triple Data Encryption Algorithm Modes of Operation*, incorporated herein. The Data Encryption Standard ("DES") is an encryption block cipher that applies a 56-bit key to each 64-bit block of data. DES enables strong encryption based on symmetric cryptography, i.e. both the sender and receiver must know the same secret key. This key is used for both encryption and decryption. DES can also be used for single-user encryption, e.g. to encrypt files and folders on a hard disk. DES is sometimes used with 3 keys, in which case it is known as "triple DES" or 3DES.

The skilled artisan will further appreciate that in addition to using the 3DES algorithm and 3DES encryption keys, the present invention uses the Secure Hash Algorithm ("SHA1") for hashing computations. The Secure Hash Algorithm takes a message of less than $2^{64}$ bits in length and produces a 160-bit message digest which is designed so that it should be computationally expensive to find a text which matches a given hash. For example, if you have a hash for document A, H(A), it is difficult to find a document B which has the same hash, and even more difficult to arrange that document B says what you want it to say. The use of the SHA1 algorithm adds a further level of security to the present invention, in addition to the algorithms contained in the 3DES standard.

Beginning at step 302, the electronic document file the user desires to encrypt is divided into blocks. In the preferred embodiment, the blocks of plain, e.g., unencrypted data, are 8-bytes in size. The skilled artisan will appreciate that other sizes are equally capable of being used, with modifications made herein, without departing from the scope of the subject invention. The algorithm then generates key blocks at step 304. The key blocks of the present invention are 16-bytes in size, thereby complimentary to the plain data blocks of the electronic document file. Continuing at step 304, the 16-byte key blocks are divided into two halves, a left part ("Encryption Key Left") and a right part ("Encryption Key Right"). The electronic document file is then encrypted at step 306 using the Encryption Key Left to generate first level encryption data. At step 308, the first level encrypted data is decrypted with the Encryption Key Right to generate second level encryption data. The second level encrypted data is then encrypted with the Encryption Key Left to generate final level encrypted data at step 310.

Returning to FIG. 2, after the electronic document file has been encrypted, the multifunctional peripheral device 102 prompts the associated user to select a desired action to perform with respect to the encrypted file at step 220. As will be appreciated by those skilled in the art, the multifunctional peripheral device 102 is suitably capable of performing a variety of services for an associated user, including scanning, copying, faxing, and printing. Accordingly, at step 222, the user desires to store the encrypted file for a preselected period of time. The user then specifies the location where the encrypted file is to be stored and the multifunctional peripheral device 102 stores the file at step 224.

The user is further capable of selecting a transmission option, such as email, FTP, and the like, at step 226. The user is prompted for the destination address of the intended recipient or recipients at step 228. The encrypted file is then transmitted to the selected destination or destination at step 230. The user is also capable of determining that the encrypted file needs to be deleted from the multifunctional peripheral device 102 associated memory. The user, at step 232, selects the delete option and the encrypted file is deleted from associated memory at step 234. When the user determines that deleting the encrypted file is not desired at step 232, the multifunctional peripheral device 102 prompts the user at 220 to select an action to perform with respect to the encrypted file.

Figure 4:
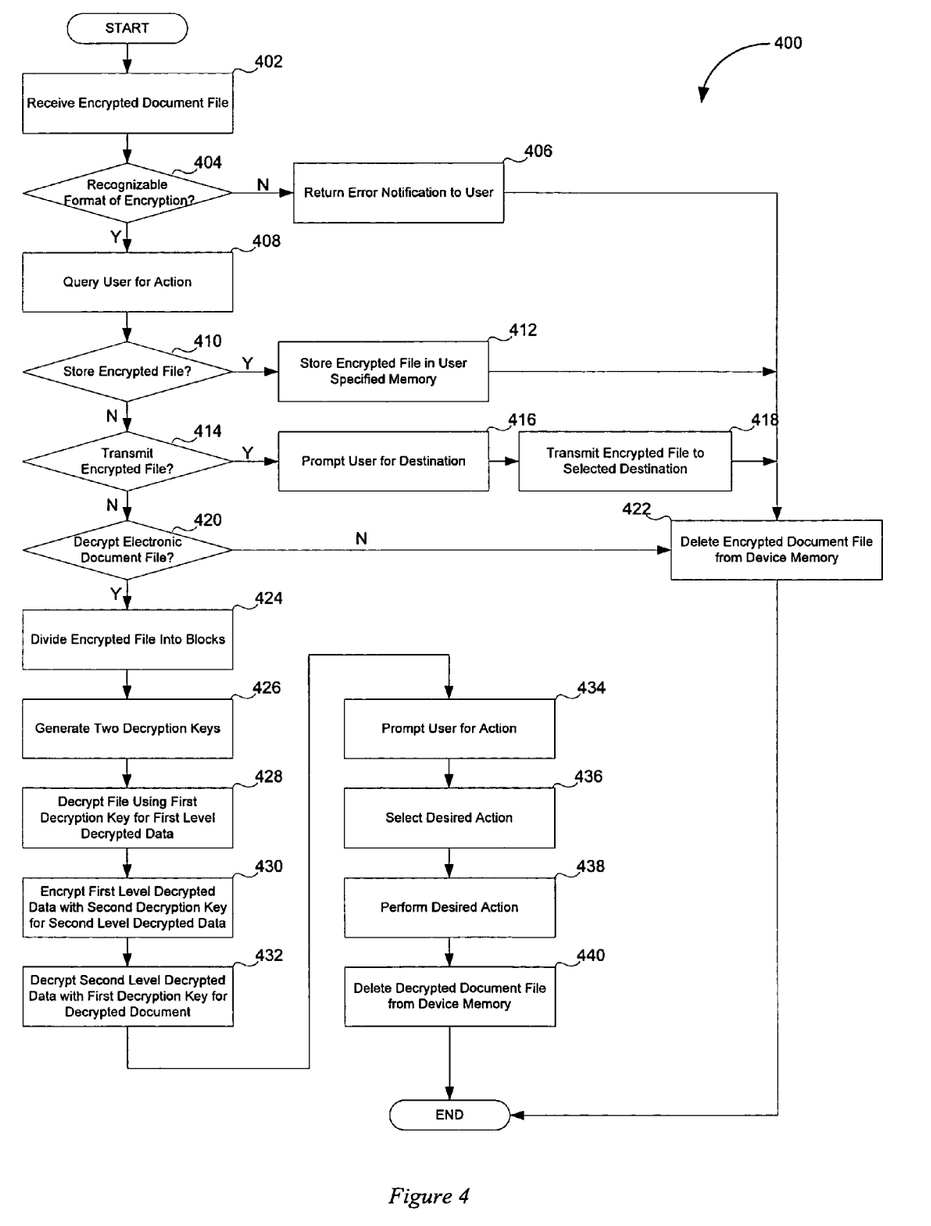
FIG. 4 is a flowchart illustrating the decryption process according to the present invention.

Turning now to FIG. 4, there is shown the decryption process 400 of the present invention illustrating the decryption of an encrypted electronic document file at the multifunctional peripheral device 102. The multifunctional peripheral device 102 receives an encrypted document file at step 402. At step 404, the device 102 makes a determination that the encryption used by the document file is not compatible with the algorithms used by the device 102. Accordingly, the user is notified of the incompatibility or error at step 406 and to maintain the security of the document, the file is deleted at step 422 from the multifunctional peripheral device 102 associated memory.

When the encrypted file is in a recognizable format, the user is queried at step 408 for an action to be taken with respect to the encrypted file. When the user desires to store the encrypted file at step 410, the file is stored in user selected memory at step 412. To maintain data security, the multifunctional peripheral device 102 then deletes the encrypted file from its associated memory at step 422. The skilled artisan will appreciate that such deletion from the multifunctional peripheral device 102 at step 422 prevents unauthorized access to the encrypted file by others with access to the device 102. Those skilled in the art will further understand that this level of data security is in addition to the security provided by employing the present invention.

When the user does not desire to store the encrypted file at step 410, the process moves to step 414, where the user determines whether to transmit the encrypted file to another destination. For example, the user is capable of selecting to transmit the file to an email address or portable storage medium. The user is prompted for the destination of the encrypted file at step 416. Once the user has input the desired destination address or location for the encrypted file, the file is transmitted to the selected destination at step 418. The multifunctional peripheral device 102 then deletes the encrypted file from its associated memory at step 422.

When the user does not require the transmission of the encrypted file at step 414, the method progresses to step 420 where a decision whether to decrypt the encrypted file is made. When the user desires not to decrypt the encrypted file, e.g., cancel the operation, the encrypted file is deleted from device 102 memory at step 422 and the process ends. When the user desires to decrypt the file at step 420, e.g., printing or faxing of the document contained in the encrypted file, the encrypted document file is divided into data blocks at step 424. In accordance with the present invention, the data blocks are 8-bytes in size corresponding to the data block size used during the encryption process. As will be understood by those skilled in the art, the encryption block size and the decryption block size are suitably selected to maintain data integrity and to enable the decryption of encrypted data at a later time.

Once the document file has been divided at step 424, the method proceeds to step 426, where decryption key blocks are generated. Continuing with the 8-byte data size, the key blocks are divided into two halves, the left part ("Decryption Key Left") and the right part ("Decryption Key Right"). The electronic data file is then decrypted at step 428 using the Decryption Key Right to generate first level decrypted data. The first level decrypted data is then encrypted at step 430 using the Decryption Key Left to generate second level decrypted data. The second level decrypted data is then decrypted at step 432 using the Decryption Key Right to generate the final decrypted electronic document file. Once the document file has been decrypted, the user is prompted for an action to be performed with respect to the decrypted file at step 434.

At step 436, the user selects the action desired to be performed on the decrypted electronic document file and the selected action is performed by the multifunctional peripheral device 102 at step 438. In accordance with the security features of the present invention, after completion of the desired action at step 438, the decrypted document file is deleted from the multifunctional peripheral device's 102 memory at step 440.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method for adding data encryption services to a document processing device comprising the steps of:
   receiving encryption enablement software into an associated document processing device, which encryption enablement software includes at least two alternative encryption mechanisms;
   receiving selection data representative of a selected one of the alternative encryption mechanisms;
   activating, on the document processing device, a selected one of the alternative encryption mechanisms in accordance with the selection data;
   generating a prompt to an associated user to selectively engage the selected encryption mechanism;
   receiving instructions from the associated user to commence encryption of an associated electronic document file;
   encrypting the electronic document file using a encryption algorithm set by the encryption enablement software;
   dividing the electronic document file into multi-byte blocks;
   generating a multi-bit encryption key;
   segmenting the multi-bit encryption key into a first encryption key portion and a second encryption key portion;
   encrypting the electronic document file by using first encryption key portion to form first level encryption data from the multi-byte blocks in accordance with the selected encryption mechanism;
   decrypting the first level encryption data with the second encryption key portion to form second level encryption data in accordance with the selected encryption mechanism; and
   encrypting the second level encryption data with the first encryption key portion to form final level encryption data in accordance with the selected encryption mechanism.

2. The method for adding data encryption services to a document processing device of claim 1 further comprising the step of decrypting the final level encryption data.

3. The method for adding data encryption services to a document processing device of claim 2, wherein the step of decrypting the final level encryption data further comprises the steps of:
dividing the final level encryption data into first and second blocks;
generating first and second decryption key portions;
decrypting the final level encryption data using the first decryption key portion to form first level decrypted data;
encrypting the first level decrypted data using the second decryption key portion to form second level decrypted data; and
decrypting the second level decrypted data using the first decryption key portion to form final decrypted data.

4. The method for adding data encryption services to a document processing device of claim 3, further comprising the steps of:
displaying, to an associated user, a group of actions to be performed by the document processing device;
selecting, by an associated user, one of the group of actions to be performed by the document processing device; and
performing the selected action.

5. The method for adding data encryption services to a document processing device of claim 4, wherein the selected action is one of the group consisting of printing, scanning, faxing, storing, transmitting and deleting.

6. The method for adding data encryption services to a document processing device of claim 1, wherein at least one of the alternative encryption mechanisms is a triple data encryption standard.

7. The method for adding data encryption services to a document processing device of claim 1, wherein the first key portion and the second key portion are each 8 bytes in length.

8. A system for adding data encryption services to a document processing device including a processor operating on instructions disposed in an associated memory, the system comprising:
means adapted for receiving encryption enablement software into an associated document processing device, which encryption enablement software includes at least two alternative encryption mechanisms;
means adapted for receiving selection data representative of a selected one of the alternative encryption mechanisms;
means adapted for activating, on the document processing device, a selected one of the alternative encryption mechanisms in accordance with the selection data;
means adapted for generating a prompt to an associated user to selectively engage the selected encryption mechanism;
means adapted for receiving instructions from the associated user to commence encryption of an associated electronic document file;
means adapted for encrypting the electronic document file using a encryption algorithm set by the encryption enablement software;
means adapted for dividing the electronic document file into multi-byte blocks;
means adapted for generating a multi-bit encryption key;
means adapted for segmenting the multi-bit encryption key into a first encryption key portion and a second encryption key portion;
means adapted for encrypting the electronic document file by using first encryption key portion to form first level encryption data from the multi-byte blocks in accordance with the selected encryption mechanism;
means adapted for decrypting the first level encryption data with the second encryption key portion to form second level encryption data in accordance with the selected encryption mechanism; and
means adapted for encrypting the second level encryption data with the first encryption key portion to form final level encryption data in accordance with the selected encryption mechanism.

9. The system for adding data encryption services to a document processing device of claim 8 further comprising means adapted for decrypting the final level encryption data.

10. The system for adding data encryption services to a document processing device of claim 9, wherein the means adapted for decrypting the final level encryption data further comprises:
means adapted for dividing the final level encryption data into first and second blocks;
means adapted for generating first and second decryption key portions;
means adapted for decrypting the final level encryption data using the first decryption key portion to form first level decrypted data;
means adapted for encrypting the first level decrypted data using the second decryption key portion to form second level decrypted data; and
means adapted for decrypting the second level decrypted data using the first decryption key portion to form final decrypted data.

11. The system for adding data encryption services to a document processing device of claim 10, further comprising:
means adapted for displaying, to an associated user, a group of actions to be performed by the document processing device;
means adapted for selecting, by an associated user, one of the group of actions to be performed by the document processing device; and
means adapted for performing the selected action.

12. The system for adding data encryption services to a document processing device of claim 11, wherein the selected action is one of the group consisting of printing, scanning, faxing, storing, transmitting and deleting.

13. The system for adding data encryption services to a document processing device of claim 8, wherein at least one of the alternative encryption mechanisms is a triple data encryption standard.

14. The system for adding data encryption services to a document processing device of claim 8, wherein the first key portion and the second key portion are each 8 bytes in length.

15. A computer-implemented method for adding data encryption services to a document processing device comprising the steps of:
receiving encryption enablement software into an associated document processing device, which encryption enablement software includes at least two alternative encryption mechanisms;
receiving selection data representative of a selected one of the alternative encryption mechanisms;
activating, on the document processing device, a selected one of the alternative encryption mechanisms in accordance with the selection data;
generating a prompt to an associated user to selectively engage the selected encryption mechanism;
receiving instructions from the associated user to commence encryption of an associated electronic document file;
encrypting the electronic document file using a encryption algorithm set by the encryption enablement software;

dividing the electronic document file into multi-byte blocks;

generating a multi-bit encryption key;

segmenting the multi-bit encryption key into a first encryption key portion and a second encryption key portion;

encrypting the electronic document file by using first encryption key portion to form first level encryption data from the multi-byte blocks in accordance with the selected encryption mechanism;

decrypting the first level encryption data with the second encryption key portion to form second level encryption data in accordance with the selected encryption mechanism; and encrypting the second level encryption data with the first encryption key portion to form final level encryption data in accordance with the selected encryption mechanism.

16. The computer-implemented method for adding data encryption services to a document processing device of claim 15 further comprising the step of decrypting the final level encryption data.

17. The computer-implemented method for adding data encryption services to a document processing device of claim 16, wherein the step of decrypting the final level encryption data further comprises the steps of:

dividing the final level encryption data into first and second blocks;

generating first and second decryption key portions;

decrypting the final level encryption data using the first decryption key portion to form first level decrypted data;

encrypting the first level decrypted data using the second decryption key portion to form second level decrypted data; and decrypting the second level decrypted data using the first decryption key portion to form final decrypted data.

18. The computer-implemented method for adding data encryption services to a document processing device of claim 17, further comprising the steps of:

displaying, to an associated user, a group of actions to be performed by the document processing device;

selecting, by an associated user, one of the group of actions to be performed by the document processing device; and performing the selected action.

19. The computer-implemented method for adding data encryption services to a document processing device of claim 18, wherein the selected action is one of the group consisting of printing, scanning, faxing, storing, transmitting and deleting.

20. The computer-implemented method for adding data encryption services to a document processing device of claim 15, wherein at least one of the alternative encryption mechanisms is a triple data encryption standard.

21. The computer-implemented method for adding data encryption services to a document processing device of claim 15, wherein the first key portion and the second key portion are each 8 bytes in length.

* * * * *